Aug. 2, 1932.  R. T. BINNIE  1,870,033
APPARATUS FOR EXTRACTING LIQUID FROM SOLID OR SEMISOLID MATTER BY PRESSURE
Filed July 9, 1930  5 Sheets-Sheet 3
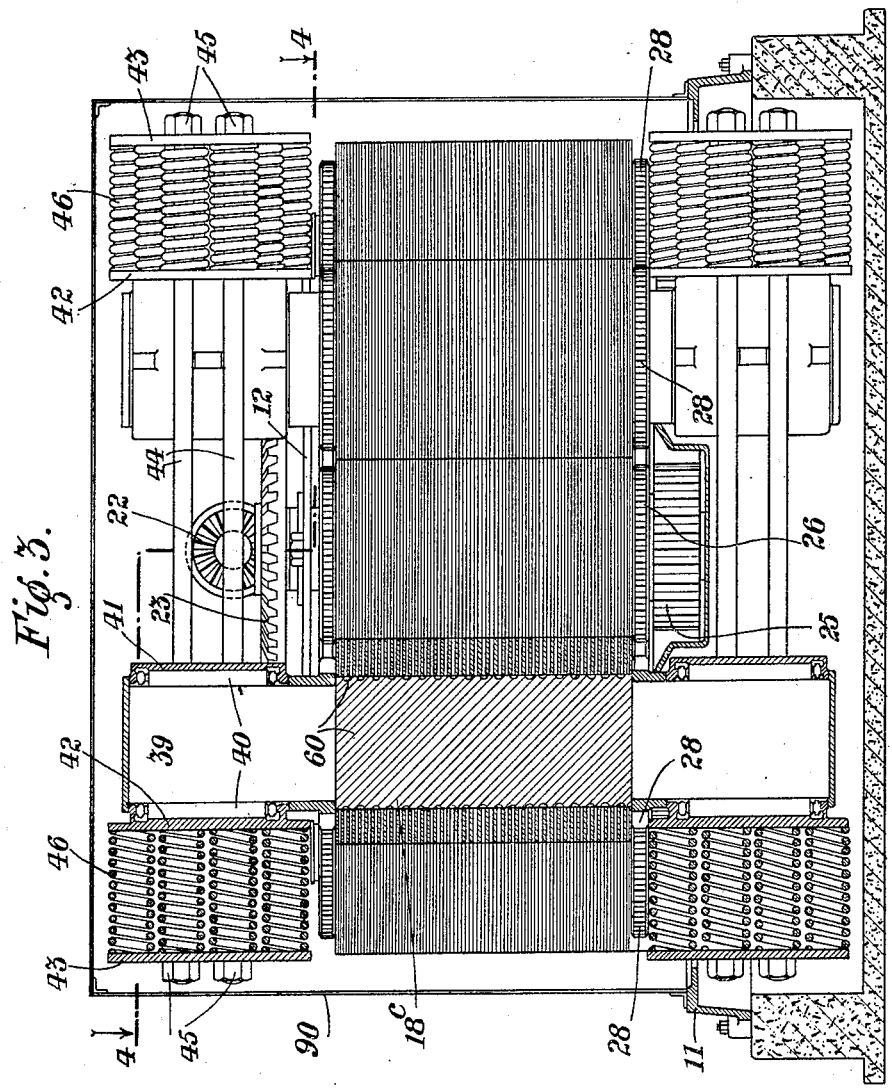
Inventor:
Robert Taylor Binnie
By
Atty.

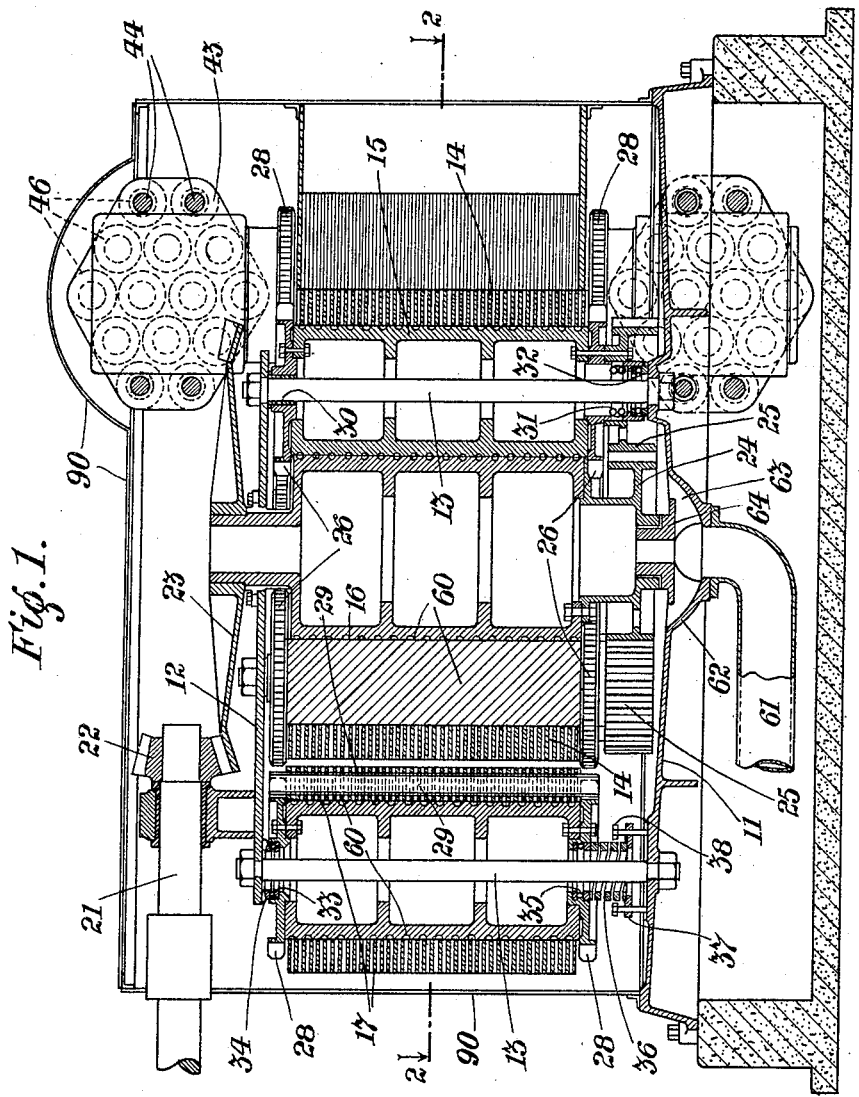

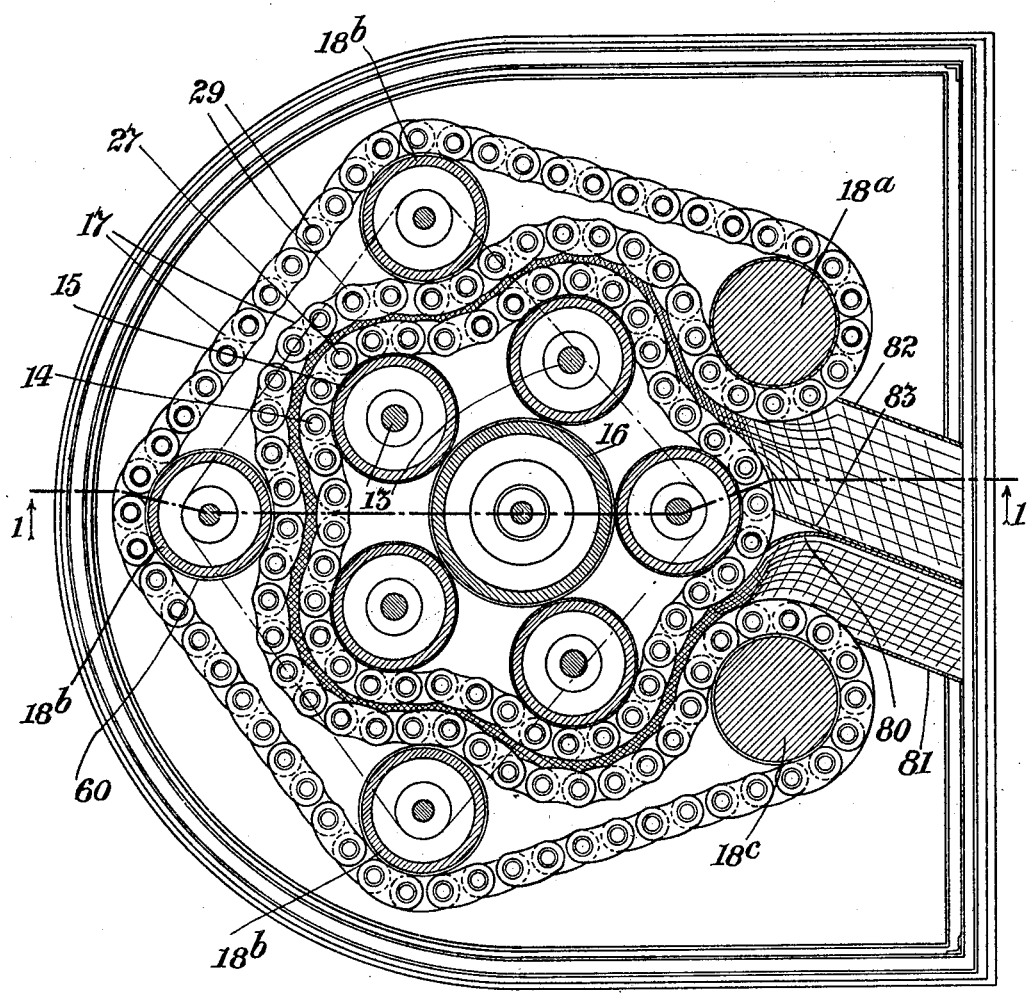

Aug. 2, 1932.    R. T. BINNIE    1,870,033
APPARATUS FOR EXTRACTING LIQUID FROM SOLID OR SEMISOLID MATTER BY PRESSURE
Filed July 9, 1930    5 Sheets-Sheet 4
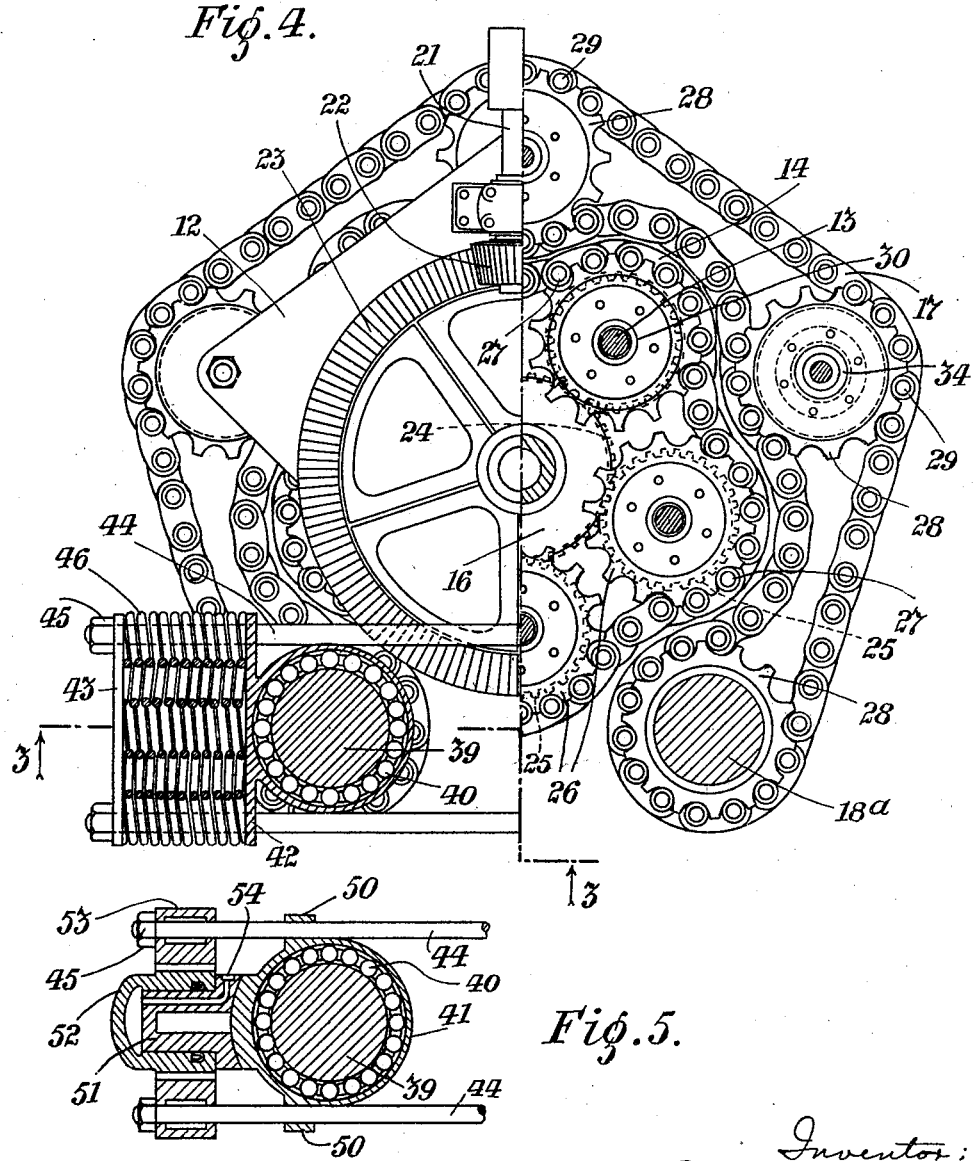

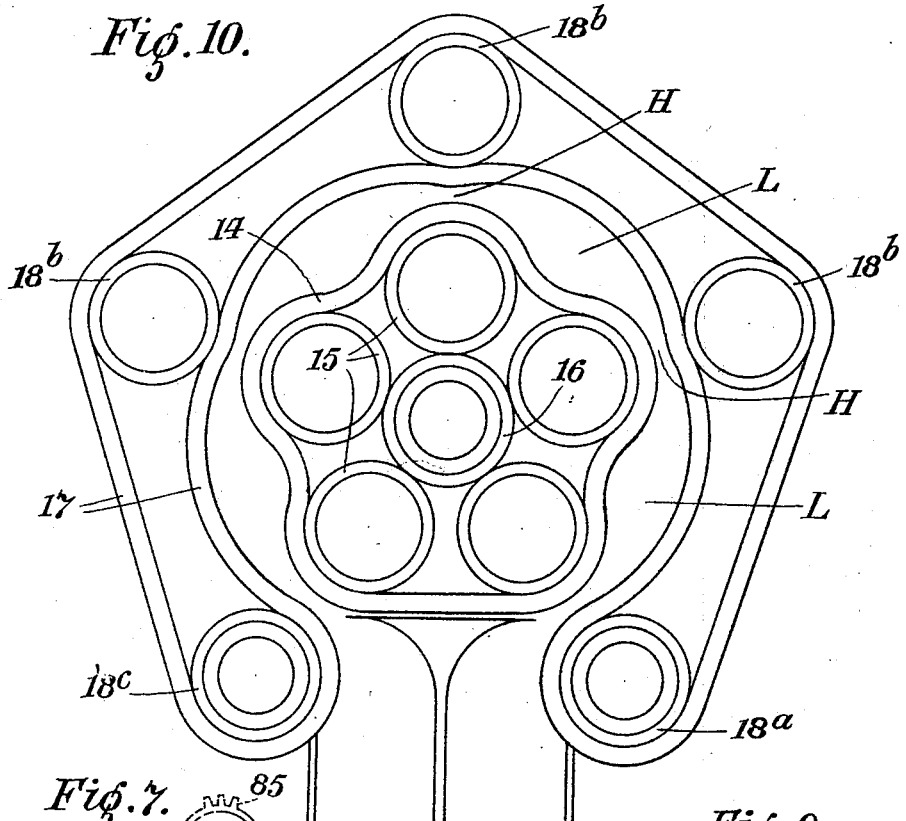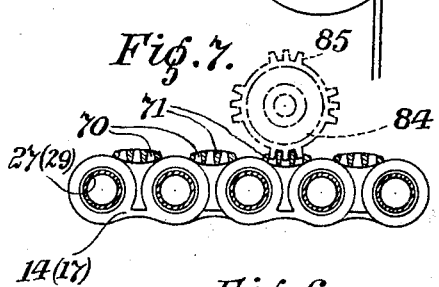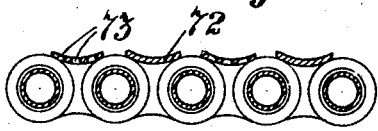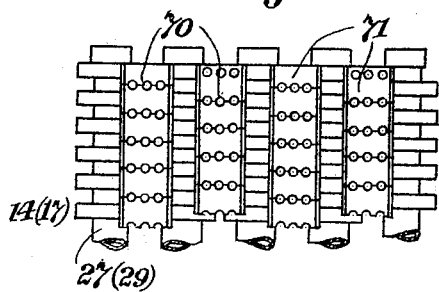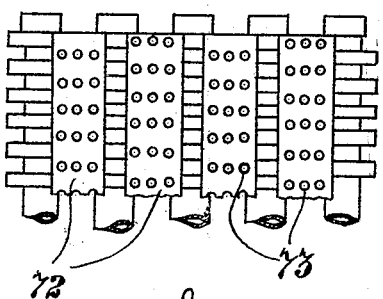

Patented Aug. 2, 1932

1,870,033

UNITED STATES PATENT OFFICE

ROBERT TAYLOR BINNIE, OF GLASGOW, SCOTLAND, ASSIGNOR OF ONE-HALF TO WILLIAM MILLER, OF EDINBURGH, SCOTLAND

APPARATUS FOR EXTRACTING LIQUID FROM SOLID OR SEMISOLID MATTER BY PRESSURE

Application filed July 9, 1930, Serial No. 466,637, and in Great Britain February 12, 1930.

This invention relates generally to apparatus for extracting liquid from solid or semi-solid matter by pressure and particularly to apparatus for extracting juice from sugar cane.

The object of the invention is to provide apparatus which will be subjected when its parts are in movement to a minimum load due to frictional resistance, this object being attained by mounting the various rotating parts so far as possible in equilibrium in so far as concerns the pressure upon and reaction of the material in relation to said parts.

The invention comprises apparatus for extracting liquid from material containing liquid or moisture by passing said material between endless moving surfaces, wherein said surfaces are presented, firstly, by an inner member passing around internal supporting means in equilibrium (i. e. in so far as concerns the pressure upon and reaction of the material) and, secondly, by an outer member which is guided around the inner member by terminal guides and by one or more intermediate guides likewise in equilibrium.

The said internal supporting means may comprise guide rollers arranged in a circular series and a central support against which said rollers bear, the arrangement being such that said rollers and support are in equilibrium.

One form which the invention may take is illustrated by way of example in the accompanying drawings, in which:—

Fig. 1 is a vertical section of a ten-roller mill for extracting juice from sugar cane, the section being taken on the line I—I of Fig. 2, which is a section on the line 2—2 of Fig. 1.

Fig. 3 is partly an elevation at right angles to Fig. 1 and partly a section, the section being taken on the line 3—3 of Fig. 4, which is a section on the line 4—4 of Fig. 3.

Fig. 5 is a fragmentary view showing a modification in a detail of construction.

Fig. 6 is a plan of a portion of one of the travelling members, while Fig. 7 is an elevation of Fig. 6.

Figs. 8 and 9 are views coresponding to Figs. 6 and 7 but showing a modification.

Fig. 10 is a diagrammatic view showing a modified arrangement of a ten-roller mill.

The mill comprises an inner chain-and-roller unit and an outer chain-and-roller unit, the outer chain being arranged to wrap the inner unit partly and so leave passages for the introduction and discharge of the sugar cane to and from the mill.

Both units are supported by a frame comprising mainly a base 11 and a top plate 12, these parts being held rigid by connecting bolts 13. The inner unit consists of a broad endless band of chain 14 and five inner rollers 15 around which the chain 14 passes and which are arranged in a circular series around a central roller 16. The outer unit also comprises a broad endless band of chain 17, this chain being arranged in a double loop around five outer rollers arranged substantially in a circular series, the terminal rollers of this series being marked 18$^a$ and 18$^c$ and the intermediate rollers being marked 18$^b$.

The inner rollers 15 and the chain 14 therewith are adapted to be driven in the counter-clockwise direction, as viewed in Fig. 2 or 4. The mechanism for driving the unit includes a shaft 21 driven externally of the mill in any suitable manner. A bevel-pinion 22 on the shaft 21 meshes with a bevel-gear-wheel 23 secured to the top of the central roller 16. A pinion-wheel 24 on the bottom end of the roller 16 meshes with a series of gear-wheels 25, there being one of these gear-wheels on each of the inner rollers 15.

Each of the rollers 15 is provided top and bottom with chain-wheels 26 which are engaged by tubular rods 27 (see Fig. 4) passing vertically through and beyond the inner chain. Likewise the outer rollers 18$^a$, 18$^b$ and 18$^c$ are provided top and bottom with chain-wheels 28 which are engaged by tubular rods 29 passing vertically through and beyond the outer chain 17.

The entire arrangement is such that the inner loop portion of the outer chain is adapted to follow closely the course of the inner chain from the roller 18$^a$ to the roller 18$^c$. Accordingly, if sugar cane be passed between the inner and outer chains in the vicinity of the roller 18ᵃ, the cane will be carried through the space between the chains until the roller 18ᶜ is reached, at which point the cane will be discharged from the mill. The frictional engagement between the chains and the cane is sufficient to drive the outer chain together with the rollers 18ᵃ, 18ᵇ and 18ᶜ in the clockwise direction, as viewed in Fig. 2 or 4.

The chain-wheels 26, to which the tops of the inner rollers 15 are secured, are journalled at 30 (Fig. 1) on the top ends of the respective bolts 13. The gear-wheels 25, to which the lower ends of the rollers 15 are secured, are journalled in ball-bearings 31 and are supported on ball thrust-bearings 32 resting upon the base 11. The arrangement is such that, in the operation of the mill, the inner rollers maintain rolling contact with the surface of the central roller 16.

The chain-wheels 28, to which the top ends of the outer rollers 18ᵇ are secured, are provided with ball-bearings 33 (Fig. 1) each having a spherical seating in a ring 34 which bears against, but which is slidable with respect to, the top plate 12. The chain-wheels 28, to which the lower ends of the rollers 18ᵇ are secured, are provided with ball thrust-bearings 35 which each rest upon a spring 36. A bridge-member 37 supports each spring 36, and set-screws 38 screw-threaded through the bridge-piece 37 rest upon the base 11 and support the weight of the respective roller 18ᵇ and associated parts. The entire arrangement is such that the rollers 18ᵇ are free to wobble, so that they can adjust themselves slightly to suit variations in the thickness of the belt of sugar cane passing between the inner and outer chains.

The terminal rollers 18ᵃ and 18ᶜ are provided at each end with an extended journal 39 (Fig. 3) turning between bearing rollers 40 contained in a casing 41. Each casing 41 is formed with an abutment plate 42 which cooperates with a cover plate 43. At the top end of the mill, the plates 42 and 43 are penetrated by two pairs of bolts 44 provided at their ends with nuts 45 bearing against the plates 43. Powerful springs 46 are interposed between each pair of plates 42 and 43. The journals 39 at the bottom of the mill are similarly arranged.

The entire arrangement is such that the terminal rollers are forced powerfully but resiliently in directions in which they tension the outer chain and the latter accordingly exerts pressure upon the sugar cane passing between the two chains. By screwing or unscrewing the nuts 45, the tension of the outer chain, and accordingly the pressure exerted thereby upon the cane, can be adjusted to suit the conditions existing in the mill. At the same time, the tension of the inner chain would become proportionately adjusted.

It will be obvious that the pressure to which the terminal rollers is subjected may be derived from means other than springs. For instance, the said pressure may be derived from hydraulic means. An example of such means is illustrated in Fig. 5. As therein shown, each casing 41 has lugs 50 through which the bolts 44 pass. The casing 41 is provided with a ram 51 working in a hydraulic cylinder 52 which is secured to a supporting ring 53. The bolts 44 pass through this ring 53 and the nuts 45 bear against it. A passage 54 provided in the ram 51 serves as a conduit for pressure fluid. By adjusting the pressure of this fluid by any usual means, the force under which the journals 39 are pressed towards one another can be varied at will.

In order that the extracted juice can flow freely through the apparatus, the inner rollers 15, the central roller 16, and the outer rollers 18ᵃ to 18ᶜ all have their peripheral surfaces formed with helical grooves 60 (Fig. 1) down which the juice can pass to the base 11. A juice-delivery pipe 61 is attached to a sump 62 in the base 11, the sump having passages 63 leading below a footstep bearing 64 for the central roller 16.

Both the inner and outer chains are made as permeable pressure surfaces, and each may be made up of links such as shown in Figs. 6 and 7. As therein shown, the adjoining faces of adjacent links are formed with tapering grooves 70 cut in a flange member 71, the grooves in the said links registering with one another to provide passages through the chains for the juice.

In the modified construction shown in Figs. 8 and 9, the permeable pressure surfaces consist of plates or slats 72 which are secured to the links of the chains and which have holes 73 drilled in them to afford passages for the juice.

Some form of means is provided to maintain the chains clean and clear of obstruction. Such means may consist of scrapers such as those denoted by 80 and 81 in Fig. 2. The scrapers 80 and 81, which respectively press against the inner and outer chains, are made resilient and act to clean from the surfaces of the chains such pieces of megass as may be adhering thereto. The scrapers 80, 81 act in conjunction to guide the megass passing from the mill. Additional plates 82, 83 serve to guide the incoming cane between the chains.

In addition, or as an alternative to scrapers, members with projections for moving into and clearing the passages through the chains may be provided. Such members may consist of spiked rollers rotating in contact with the chains and with their spikes registering with the passages. For example, such a roller is indicated in dotted lines in Fig. 7, in which 84 denotes the roller and 85 the spikes.

As a further addition, or alternative, to the scrapers 80, 81 and/or rollers such as 84, the juice may be circulated through the entire apparatus including the chains under strong pressure, the juice thus serving not only as a lubricant but also as a means of cleaning the chains.

By referring to Fig. 2 or 4, it will be observed that the outer rollers 18ª to 18ᶜ are arranged alternately with the inner rollers 15; i. e. the radial planes containing the axes of the outer rollers alternate with the radial planes containing the inner rollers. According to this arrangement, a high pressure is obtained between the chains throughout the entire surface thereof extending between the vicinities of the rollers 18ª and 18ᶜ.

An alternative arrangement is shown in Fig. 10, in which the outer rollers are arranged in radial alignment with the inner rollers. According to this arrangement, the space between the chains extending from the roller 18ª to the roller 18ᶜ consists of alternate zones of intensely high pressure and comparatively low pressure, these zones being respectively denoted by H and L. The advantage of this arrangement is that the material between the chains can be macerated while passing through the low pressure zones L.

An important advantage of this invention is that, so far as the pressure upon, and reaction of, the material between the chains are concerned, the inner rollers 15 since they bear against the central roller 16 are in equilibrium, while the intermediate outer rollers 18ᵇ are also in equilibrium. Consequently, the load resulting from the pressure action between the endless members and the material is not transmitted to the journals of the rollers of the inner unit or the intermediate rollers of the outer unit. Frictional resistance to the driving of the chains is accordingly reduced.

A machine made according to the various constructions illustrated can conveniently be totally enclosed in a dust-proof or liquid-tight casing such as shown at 90 in Figs. 1 and 3.

It is to be understood that the constructions illustrated and described have been chosen simply by way of example and that modifications can be made without departing from the scope of the invention. For instance, the gearing of the mill may be so designed that the outer chain-and-roller unit is driven by a positive gear-connection with the inner unit. Instead of the rollers rotating about vertical axes, the mill may be designed so that they are either horizontal or inclined. If desired, the pressure surfaces of the chains may be formed with teeth or otherwise to assist in the crushing or breaking-up of the material passing between the chains. Further, the mill may be designed so that the outer chain-and-roller unit is adjustable as a whole relatively to the inner unit, and the rollers of each unit may if desired be of different sizes (for instance, their diameters may increase progressively from the inlet to the outlet).

In a six, eight, or twelve roller mill, each unit would comprise three, four, or six rollers, as the case may be, and these would be arranged in the same manner as in the ten-roller mill above described.

It is however not essential that the inner and outer units should have the same number of rollers.

Although the invention has been described as applied to the extraction of juice from sugar cane, it will be obvious that it can be put to other uses. One of such uses would be pressure filtering, in which event the chains would be replaced by a medium presenting a surface suited to the material to be filtered. In an apparatus adapted to press liquid out of certain materials, the chain may be made up of inter-meshing, transverse, permeable slats, or alternatively of leather or other links. Instead of a chain, there may be employed a belt of flexible perforated metal, wire-cloth, cotton, or other suitable material.

I claim:—

1. Apparatus for extracting liquid from liquid-containing material by pressure comprising, in combination, a central support, inner guide rollers arranged around and supported by said central support, an inner endless travelling member passing around said guide rollers, means for driving said member, rotatable outer guide rollers arranged around said inner guide rollers, and an outer endless travelling member passing around said outer guide rollers, said outer member partly enwrapping said inner member and being adapted to travel therewith, said members presenting pressure surfaces at least one of which is permeable.

2. Apparatus for extracting liquid from liquid-containing material by pressure comprising, in combination, a rotatable central support, a number of inner guide rollers arranged in a circular series around and supported by said central support, a driving connection between said guide rollers and said central support, an inner endless traveling member passing around said guide rollers, a driving connection between said member and said guide rollers, a number of rotatable outer guide rollers arranged in a substantially circular series around said inner guide rollers, an outer endless traveling member passing around said outer guide rollers in a double loop so as to partly enwrap said inner member and a driving connection between said outer member and outer guide rollers, said members presenting pressure surfaces at least one of which is permeable.

3. Apparatus for extracting liquid from liquid-containing material by pressure comprising, in combination, a rotatable central support, a number of inner guide rollers arranged in fixed bearings around and supported by said central support, a driving connection between said guide rollers and said central support, an inner endless travelling member passing around said guide rollers, a driving connection between said member and said guide rollers, a number of rotatable outer guide rollers arranged in resiliently mounted bearings around said inner guide rollers, said bearings permitting said outer rollers to tilt, an outer endless travelling member passing around said outer guide rollers and partly enwrapping said inner member, said outer member being adapted to travel with said inner member, and a driving connection between said outer member and outer guide rollers, said members presenting pressure surfaces either or each of which is permeable.

4. Apparatus for extracting liquid from liquid-containing material by pressure comprising, in combination, a rotatable central support, a number of fixed bearings arranged in a circular series around said central support, inner guide rollers journalled in said bearings and supported by said support, a driving connection between said guide rollers and said central support, an inner endless travelling member passing around said guide rollers, a driving connection between said member and said guide rollers, a number of resiliently mounted bearings arranged in a substantially circular series around said inner guide rollers, outer guide rollers journalled in said resiliently mounted bearings, an outer endless travelling member adapted to travel with said outer member and passing around said outer guide rollers in a double loop so as to partly enwrap said inner member and a driving connection between said outer member and outer guide rollers, said members presenting pressure surfaces at least one of which is permeable.

5. Apparatus for extracting liquid from liquid-containing material comprising, in combination, an inner movable member presenting an endless pressure surface, internal supporting means for said member, said means comprising guide rollers arranged in a circular series and a central support against which said rollers bear, the arrangement being such that said member presses inwardly around said rollers so as to maintain them and the support in equilibrium, an outer movable member extending partly around said inner member and presenting thereto an endless pressure surface, terminal and intermediate guides for said outer member, and means for driving said inner member.

6. Apparatus for extracting liquid from liquid-containing material comprising, in combination, an inner movable member presenting an endless pressure surface, internal supporting means for said member, said means comprising a rotatable central support, guide rollers so arranged around and supported by said support that said member acts to maintain the rollers and support in equilibrium, a driving connection between said guide rollers and said central support, a driving connection between said member and said guide rollers, an outer movable member extending partly around said inner member and presenting thereto an endless pressure surface, terminal and intermediate guides for said outer member, and means for rotating said central support.

7. Apparatus for extracting liquid from liquid-containing material by pressure comprising, in combination, a frame, a central support rotatably mounted in said frame, a number of inner guide rollers arranged in a circular series around and supported by said central support, a driving connection between said guide rollers and said central support, an inner endless travelling member passing around said guide rollers, a driving connection between said member and said guide rollers, terminal and intermediate rotatable outer guide rollers arranged in a substantially circular series around said inner guide rollers, said intermediate rollers being free to wobble, an outer endless travelling member passing around said outer guide rollers in a double loop so as to partly enwrap said inner member, a driving connection between said outer member and outer guide rollers, said members presenting pressure surfaces at least one of which is permeable, relatively movable bearings on said frame for said terminal rollers, and a yieldable connection between said bearings exerting an adjustable tension, the effect of which is to maintain the desired pressure between the inner and outer members.

8. Apparatus for extracting liquid from liquid-containing material by pressure comprising, in combination, a frame, a rotatable central support arranged therein, a number of inner guide rollers arranged in fixed bearings on said frame and supported by said central support, a driving connection between said guide rollers and said central support, an inner endless travelling member passing around said guide rollers, a driving connection between said member and said guide rollers, terminal and intermediate rotatable outer guide rollers arranged around said inner guide rollers, the intermediate rollers having bearings resiliently mounted on said frame so that said intermediate rollers are permitted to tilt, an outer endless travelling member passing around said outer guide rollers and partly enwrapping said inner member, said outer member being adapted to travel with said inner member, a driving connection between said outer member and outer guide rollers, relatively movable bearings on said frame for said terminal rollers, and a yieldable connection between said bearings exerting an adjustable tension, the effect of which is to maintain the desired pressure between the inner and outer members, said members presenting pressure surfaces either or each of which is permeable.

In testimony whereof I affix my signature.

ROBERT TAYLOR BINNIE.